United States Patent [19]

Golden et al.

[11] Patent Number: 5,536,302
[45] Date of Patent: Jul. 16, 1996

[54] ADSORBENT FOR REMOVAL OF TRACE OXYGEN FROM INERT GASES

[75] Inventors: Timothy C. Golden; Charles H. Johnson, III, both of Allentown, Pa.

[73] Assignee: Air Products and Chemicals, Inc., Allentown, Pa.

[21] Appl. No.: 475,111

[22] Filed: Jun. 7, 1995

Related U.S. Application Data

[63] Continuation-in-part of Ser. No. 216,738, Mar. 23, 1994, abandoned.

[51] Int. Cl.⁶ .................................................. B01D 53/04
[52] U.S. Cl. ................... 95/138; 95/148; 95/901; 96/153; 55/524; 502/416
[58] Field of Search ............... 95/96, 106, 115, 95/138, 901; 96/108, 153; 55/512, 524; 423/219; 502/416, 417

[56] References Cited

U.S. PATENT DOCUMENTS

| | | | |
|---|---|---|---|
| 3,859,417 | 1/1975 | Teller | 423/219 X |
| 3,876,393 | 4/1975 | Kasai et al. | 95/901 X |
| 4,000,246 | 12/1976 | Walles | 423/219 X |
| 4,271,133 | 6/1981 | Tellis | 423/230 |
| 4,421,533 | 12/1983 | Nishino et al. | 95/138 |
| 4,433,981 | 2/1984 | Slaugh et al. | 55/59 |
| 4,490,160 | 12/1984 | Yuki et al. | 95/138 |
| 4,529,577 | 7/1985 | Chen et al. | 423/219 X |
| 4,572,723 | 2/1986 | Ward | 95/96 |
| 4,579,723 | 4/1986 | Weltmer et al. | 423/219 |
| 4,594,231 | 6/1986 | Nishino et al. | 423/210 |
| 4,702,749 | 10/1987 | Sincar et al. | 95/96 |
| 4,734,273 | 3/1988 | Haskell | 95/106 X |
| 4,746,332 | 5/1988 | Tomomura et al. | 95/138 |
| 4,746,502 | 5/1988 | Erickson | 423/579 |
| 4,747,855 | 5/1988 | Hirai et al. | 95/106 |
| 4,859,438 | 8/1989 | Lindbauer et al. | 423/239 |
| 4,869,883 | 9/1989 | Thorogood et al. | 423/219 |
| 5,015,411 | 5/1991 | Tom et al. | 252/194 |
| 5,081,097 | 1/1992 | Sharma et al. | 502/417 |
| 5,194,233 | 3/1993 | Kitahara et al. | 423/210 |

FOREIGN PATENT DOCUMENTS

| | | | |
|---|---|---|---|
| 60-139337 | 7/1985 | Japan | 95/96 |
| 4-71641 | 3/1992 | Japan . | |
| 4-110037 | 4/1992 | Japan | 423/219 |
| 4-363109 | 12/1992 | Japan | 95/96 |
| 0961925 | 6/1964 | United Kingdom | 95/138 |

*Primary Examiner*—Robert Spitzer
*Attorney, Agent, or Firm*—Mary E. Bongiorno; Geoffrey L. Chase

[57] ABSTRACT

An adsorbent and a process for its use in removing trace oxygen from an inert gas. The adsorbent comprises a porous reducing support such as activated carbon, carbon black, coal, petroleum coke and titania which is impregnated with about 10% to about 90% by weight of an alkali metal oxide or an alkaline earth metal oxide.

8 Claims, 6 Drawing Sheets

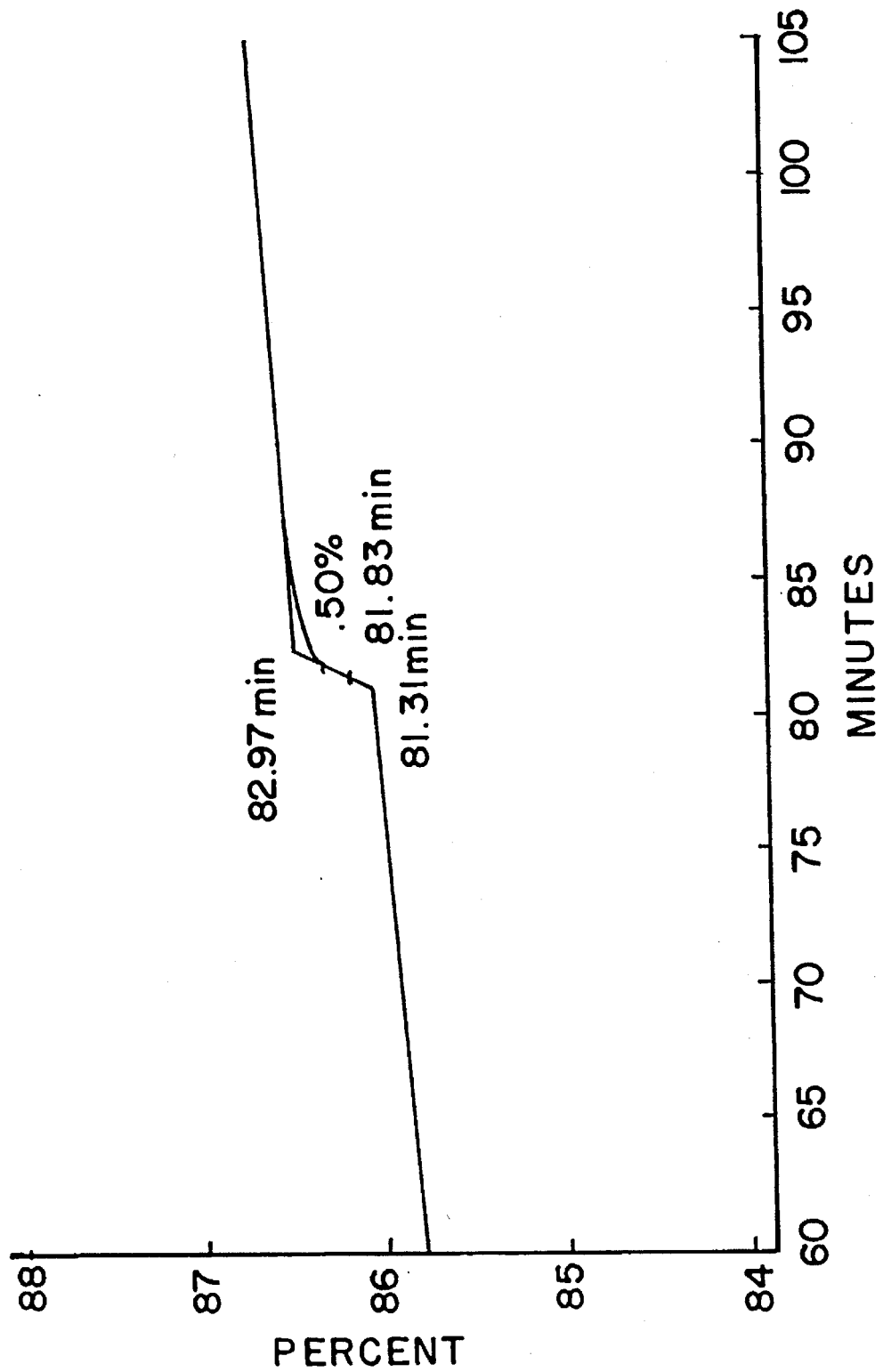

ADSORBENT FOR REMOVAL OF TRACE OXYGEN FROM INERT GASES

CROSS REFERENCE TO RELATED APPLICATIONS

This is a continuation-in-part of U.S. Ser. No. 08/216,738, filed Mar. 23, 1994 now abandoned.

FIELD OF THE INVENTION

The present invention is directed to an adsorbent which can be used for the removal of trace amounts of oxygen from inert gases.

BACKGROUND OF THE INVENTION

Ultra-high purity (UHP) inert gases such as argon and nitrogen are important in certain industries. For example, in the electronics industry, UHP nitrogen and argon are critical in the successful manufacture of silicon wafers. The following table shows the typical maximum allowable concentrations of contaminants in UHP nitrogen:

| Impurity | Maximum Allowable Concentration |
| --- | --- |
| Oxygen | 5 ppb |
| Carbon Dioxide | 10 ppb |
| Carbon Monoxide | 5 ppb |
| Water | 100 ppb |
| Methane | 10 ppb |

A major challenge is to develop materials and processes which will produce UHP gases in an efficient and cost-effective manner. Removal of impurities to ppb levels, as well as accurate sampling and analysis to determine the levels, is very difficult.

There are many techniques currently available to remove trace oxygen from inert gases but they have limitations. For example, metal alloys consisting of various metals including zirconium, aluminum, vanadium and iron have been used as high temperature oxygen getters. To activate the alloy, it is heated at 250° C.–900° C. under vacuum. After activation, the preferred temperature of operation is between 200° C. and 400° C. The getter can be used at ambient temperature, however, the oxygen gettering capacity is significantly reduced. These gettering materials are very expensive and their oxygen capacity cannot be regenerated. U.S. Pat. No. 5,194,233, for example, discloses this type of oxygen getter.

Reduced transition metal oxide catalysts, such as copper oxide and nickel oxide in the reduced form, are another group of materials which are used to remove oxygen from gas streams. Production of the reduced form of the catalysts is a strongly exothermic reaction and requires heating in a reducing atmosphere, usually hydrogen, at 150° C.–200° C. Once the oxygen capacity of the catalyst is exhausted, the catalyst must again be reduced in a reducing gas at elevated temperature. Major drawbacks for this type of catalyst are the safety hazards associated with handling the highly pyrophoric catalyst when it is in the reduced state and the requirement of hydrogen for catalyst reduction.

Deoxo catalysts are used to remove oxygen from gas streams via catalytic reaction of oxygen with hydrogen to form water. These systems require hydrogen in amounts exceeding stoichiometric amounts; therefore, water removal and hydrogen carryover must be addressed.

Use of adsorbents to remove impurities from gaseous streams are well known. For example, U.S. Pat. No. 4,271,133 discloses use of a zinc oxide adsorbent to remove hydrogen cyanide from a gaseous stream at a temperature of about ambient to about 350° C. The adsorbent comprises zinc oxide and no more than 5%, by weight, of an oxide of an alkali or alkaline earth metal.

U.S. Pat. No. 4,433,981 discloses use of an adsorbent for carbon dioxide removal from gaseous streams. The stream is contacted with an adsorbent prepared by impregnating a porous aluminum oxide support with an alkali metal or alkaline earth metal oxide or salt which is decomposable upon calcination and subsequently calcining the impregnated alumina at about 350° C.–700° C. to convert the impregnating compound to the corresponding alkali or alkaline earth metal aluminate. After using it to remove carbon dioxide, the adsorbent can be regenerated by heating to calcining conditions.

U.S. Pat. No. 4,579,723 discloses a two-bed system for removing parts per million levels of impurities such as oxygen, carbon monoxide, carbon dioxide, hydrogen and water, from an inert gas stream. The beds are comprised of reactive/adsorbent material; for example, a catalytic material such as DeOxo A (a mixture of chromium and platinum on gamma-alumina) is in the first bed and a getter material such as Dow Q1 (a mixture of copper, nickel and cobalt with traces of silver, chromium and manganese mounted on granular alumina) is in the second bed.

U.S. Pat. No. 4,594,231 discloses removal of halogens and/or hydrogen halides from gases by contacting the gas with an adsorbent comprising an activated carbon support on which are deposited two or more components from the following three groups and one or more components from the remaining two groups: (1) copper compounds; (2) zinc compounds; and (3) alkali or alkaline earth compounds, or compounds of aluminum, titanium, vanadium, chromium, manganese, iron, cobalt, nickel, chromium or lead. If compounds other than oxides are deposited on the activated carbon, heat treatment such as drying or calcining after deposition is preferred.

U.S. Pat. No. 4,859,438 discloses a method of separating impurities, such as low levels of sulfur dioxide, hydrogen chloride, and nitrogen oxides, from flue gases by contacting the gases with at least one substantially dry particulate adsorbent including $NaHCO_3$, which at a release temperature below 400° C., decomposes to form an activated adsorbent including $Na_2CO_3$.

U.S. Pat. No. 5,015,411 discloses a scavenger for removing Lewis acid and oxidant impurities from inert gases comprising an inert inorganic support and an active scavenging species on the support. The scavenger is formed by deposition of an organometallic precursor on the support and subsequent pyrolysis of the organometallic material to yield metal hydrides and/or active metals as the active scavenging species on the support.

U.S. Pat. No. 5,081,097 discloses a copper modified carbon molecular sieve for selective removal of all concentrations of oxygen in gases at temperatures up to about 200° C. and trace amounts of oxygen in gases at temperature up to about 600° C. The carbon molecular sieves are regenerated by reduction with hydrogen.

SUMMARY OF THE INVENTION

This invention is directed to an oxygen gettering material and to its use for removing trace amounts of oxygen from inert gas streams. The oxygen gettering material is a solid adsorbent composed of alkali metal oxides or alkaline earth metal oxides deposited on a porous reducing support. It is prepared by impregnating the porous reducing support with an aqueous or non-aqueous solution of an alkali metal salt or an alkaline earth metal salt, drying the impregnated support in air, and activating the impregnated support by heat treating it at 200° C.–500° C. in an inert atmosphere. Heat treatment decomposes the metal salt to the corresponding oxide. The reducing support promotes the formation of a low valent oxide which is very active for scavenging oxygen.

The major advantages to this invention are:

the adsorbent is simple to make and to use;

the adsorbent is made from relatively inexpensive components;

the adsorbent can remove trace oxygen to ppb levels;

regeneration of the adsorbent does not require hydrogen since the support supplies the reducing potential; and the adsorbent is effective for removing trace oxygen at ambient temperature.

BRIEF DESCRIPTION OF DRAWINGS

FIGS. 5 and 6 show results of thermogravimetric analysis to determine the oxygen adsorbing capability of cesium formate impregnated carbon.

DETAILED DESCRIPTION OF INVENTION

Figure 1:
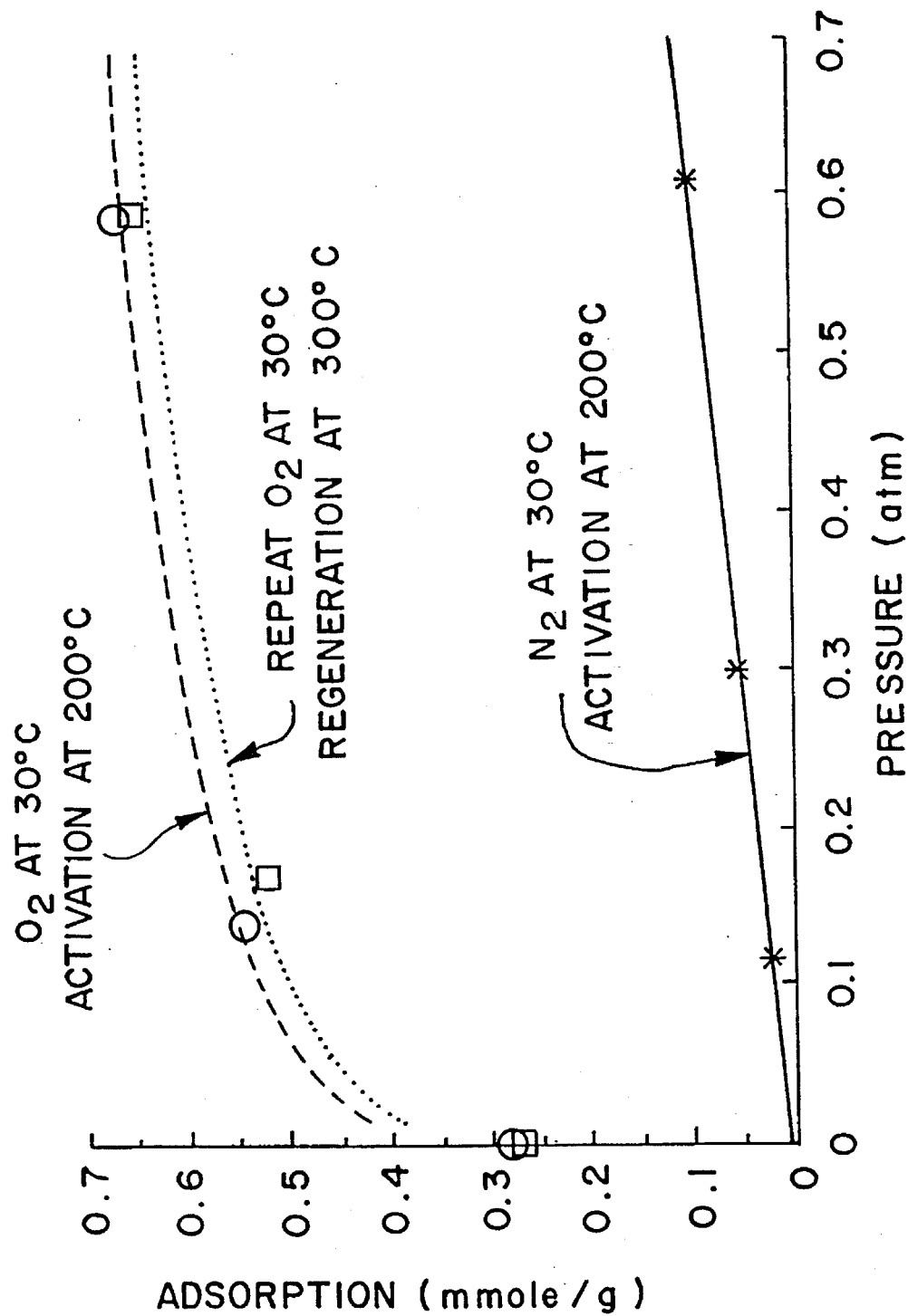
FIG. 1 shows adsorption isotherms for oxygen and nitrogen on cesium formate loaded active carbon.

Trace amounts of oxygen can be removed from an inert gas stream, such as argon or nitrogen, by passing the stream over an adsorbent comprising a solid reducing support impregnated with an alkali metal oxide or an alkaline earth metal oxide. As used herein, the term "trace" levels of oxygen refers to approximately 10 ppm or less of oxygen.

Alkali metal oxides or alkaline earth metal oxides, for example sodium oxide, potassium oxide, cesium oxide or barium oxide, are loaded onto the porous reducing support by first impregnating the support with either an aqueous or non-aqueous solution of the corresponding metal salt. Examples of appropriate salts are nitrates, oxalates, benzoates, lactates, tartrates, acetates, succinates and formates.

Although water is preferred, other solvents which can be used for dissolution of the metal salt are methanol, ethanol, acetone or ether. The weight loading of the salt is about 10 to about 90% by weight; 30 to 40% by weight is preferred.

Examples of suitable solid reducing supports include gas phase active carbon, liquid phase active carbon, carbon black, coal, petroleum coke, and titania. The preferred support is a porous carbon, for example activated carbon.

The surface area of the support is at least 10 $m^2/g$; preferably 1,000 $m^2/g$.

Impregnation is accomplished using methods well known in the art; for example incipient wetness technique, spray impregnation, and thermal spontaneous dispersion. Following impregnation, the support-salt combination is dried at approximately 50° C. to 120° C. for approximately 2 to 16 hours.

The dried impregnated support is activated by heating it under flowing inert gas to a temperature of about 200° C. to 500° C. which decomposes the salt to the corresponding oxide. Residence time of the flowing inert gas during activation is approximately 0.5 to 30 seconds; preferably 10 seconds. Successful decomposition of the metal salt to the oxide is ensured by holding the composite material at or above the decomposition temperature of the metal salt for at least about 1 hour. The adsorbent is then ready for use in removing trace oxygen from inert gas streams.

Alkali metal oxides as well as certain alkaline earth oxides can form higher oxides including peroxides and superoxides; usually, by reacting the metal oxide with an oxidizing agent, such as air, at elevated temperatures. In the present invention, an inert gas, such as nitrogen, containing a trace amount of oxygen is passed over the oxide impregnated support, preferably at ambient temperature (approximately 20° C.). The pressure can range from about 1 to about 10 atmospheres; preferably 5 atmospheres. It is believed that the oxide in the adsorbent forms a higher oxide, such as a peroxide or a superoxide, with the trace oxygen in the inert gas. The oxygen capacity of the gettering material formed according to this invention is about 0.6 weight percent.

Regeneration of the gettering material is accomplished by heat treating it in an inert atmosphere, such as nitrogen, at about 200° C. to 500° C. for approximately 16 hours; preferably 24 hours. The support provides the reducing potential to convert the peroxide or superoxide back to the oxide form of the alkali or alkaline earth metal.

A preferred method for carrying out this invention is to employ more than one adsorbent bed, in parallel, so that while one bed is being regenerated, another bed is being used for adsorption. A schematic for a two-bed operation is shown below.

| Bed | | | | | | | |
|---|---|---|---|---|---|---|---|
| 1 | Adsorption | | | D | Hot Purge | Cooldown | P |
| 2 | D | Hot Purge | Cooldown | P | Adsorption | | |

D = Depressurization    P = Pressurization

As shown in the schematic, a series of steps is conducted in each bed comprising: adsorption at elevated pressure; depressurization; hot purge, in which flow is countercurrent to the adsorption step, to regenerate the adsorbent bed; cooldown; and, repressurization of the bed prior to beginning another adsorption step. Purging may be performed using part of the nitrogen enriched product stream as a back-purge or alternately using a separate purge stream.

EXAMPLE 1

Using an incipient wetness technique, 20 grams of Sorbtech SL activated carbon was impregnated with a solution of ten grams of cesium formate dissolved in 14 ml of distilled water; weight loading of cesium formate was 33 weight % based on the total weight of carbon and cesium formate. The impregnated carbon was dried at 110° C. for 16 hours. The dried impregnated carbon was then activated by heating it at 200° C. under flowing nitrogen (residence time of 0.5 seconds) for 16 hours. The loading of metal and metal oxide was 25 weight % cesium or 27 weight % cesium oxide. Adsorption of nitrogen and oxygen was measured at 30° C. in a standard volumetric adsorption unit. The adsorbent was reactivated at 300° C. under nitrogen as in the activation step above and the measurements repeated for oxygen adsorption. FIG. 1 shows the results of the measurements. Oxygen adsorption is clearly much stronger than nitrogen adsorption. Henry's Law (ratio of initial isotherm slope for oxygen adsorption to nitrogen adsorption) selectivity of oxygen over nitrogen at this temperature is about 3,000. FIG. 1 also shows that the oxygen capacity is regained following regeneration at 300° C.

EXAMPLE 2

Figure 2:
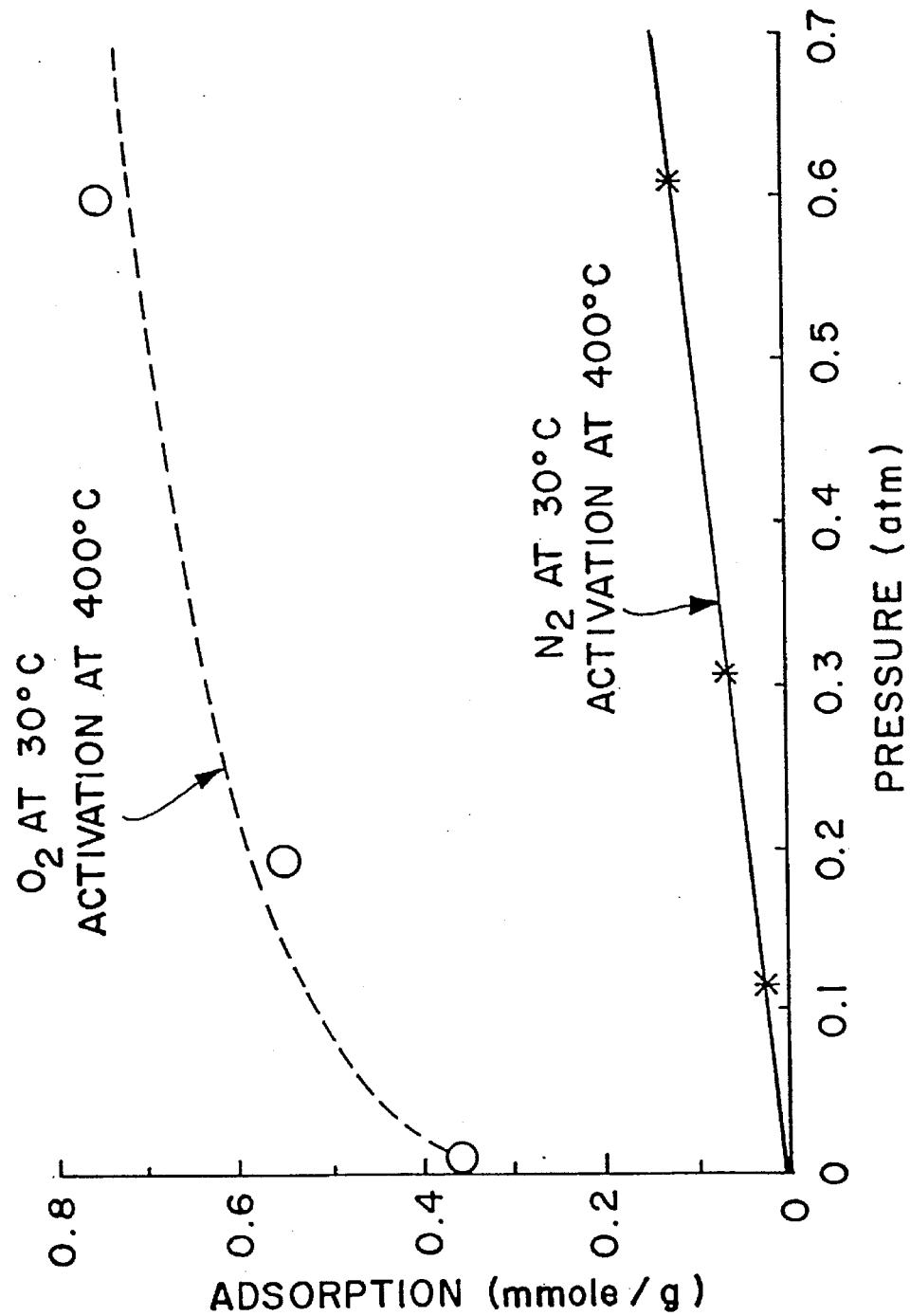
FIG. 2 shows adsorption isotherms for oxygen and nitrogen on sodium acetate loaded active carbon.

Ten grams of sodium acetate was dissolved in 14 ml of distilled water. Using the incipient wetness technique, 20 grams of Sorbtech SL activated carbon was impregnated with the sodium acetate solution; 33 weight % sodium acetate based on the total weight of carbon and sodium acetate. The mixture was air dried at 110° C. for 16 hours. The dried material was then activated in flowing nitrogen at 400° C. for 16 hours as in Example 1. The loading of metal and metal oxide was 9 weight % sodium or 13 weight % sodium oxide. Following activation, the adsorption of nitrogen and oxygen was measured at 30° C. in a volumetric adsorption apparatus. The adsorption isotherms, FIG. 2, show that the adsorbent has a much stronger adsorption for oxygen compared to nitrogen. Selectivity of oxygen compared to nitrogen is approximately 2,000, in the Henry's Law region. Regeneration of the oxygen capacity of the material required treatment in nitrogen at 400° C. as per above activation step.

EXAMPLE 3

Figure 3:
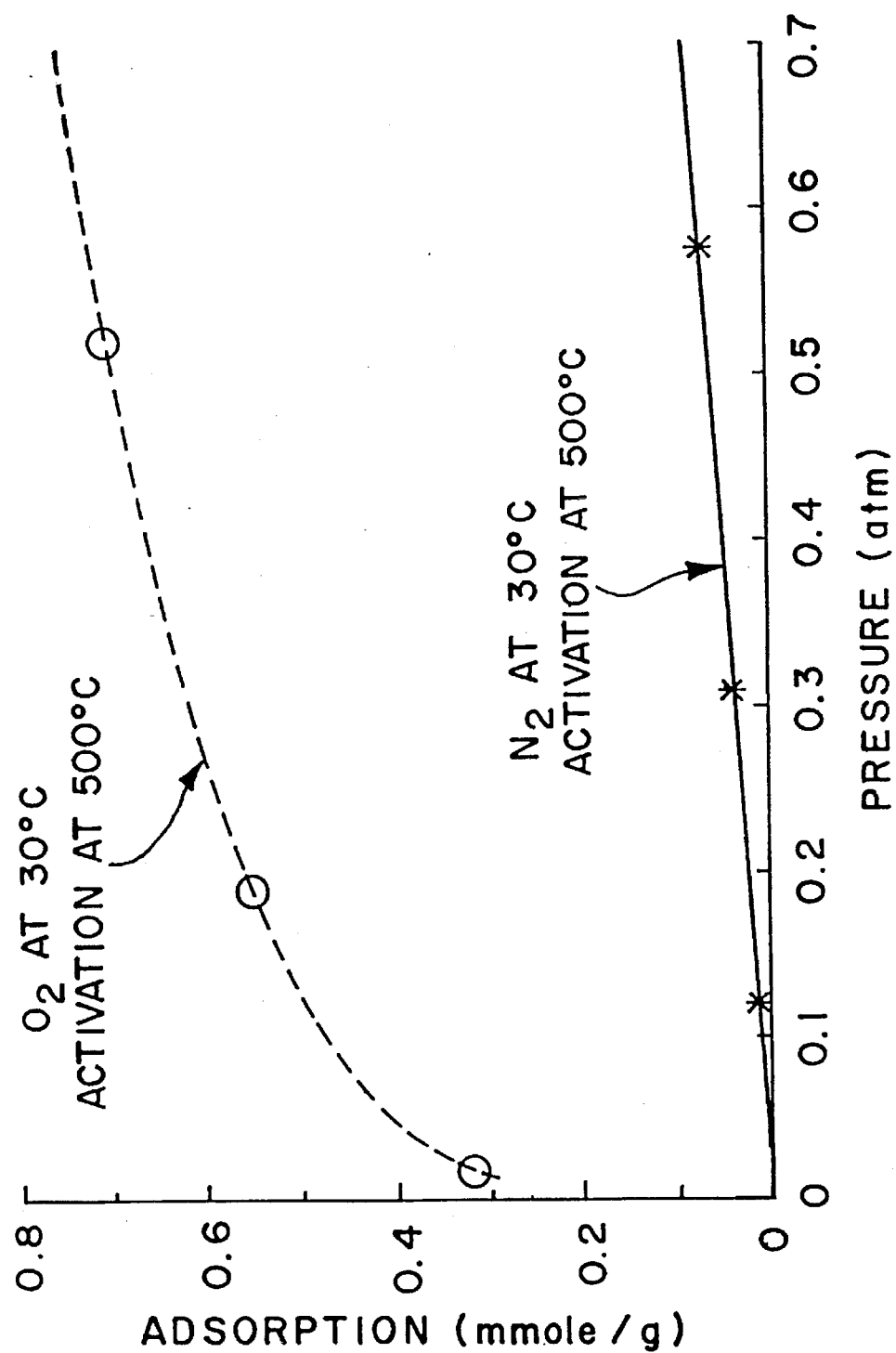
FIG. 3 shows adsorption isotherms for oxygen and nitrogen on potassium acetate loaded active carbon.

Ten grams of potassium acetate was dissolved in 15 ml of distilled water. Using an incipient wetness technique, 20 grams of BPL activated carbon was impregnated with the potassium acetate solution; 33 weight % potassium acetate based on the total weight of potassium acetate and carbon. The mixture was air dried at 110° C. for 16 hours. The dried material was then activated in flowing nitrogen at 500° C. for 16 hours. The loading of metal and metal oxide was 13 weight % potassium or 16 weight % potassium oxide. Following activation, the adsorption of nitrogen and oxygen was measured at 30° C. in a volumetric adsorption apparatus. The corresponding adsorption isotherms, FIG. 3, show a stronger adsorption of oxygen compared to nitrogen. To regenerate the adsorbent, a temperature of 500° C. in a nitrogen atmosphere was required.

EXAMPLE 4

Figure 4:
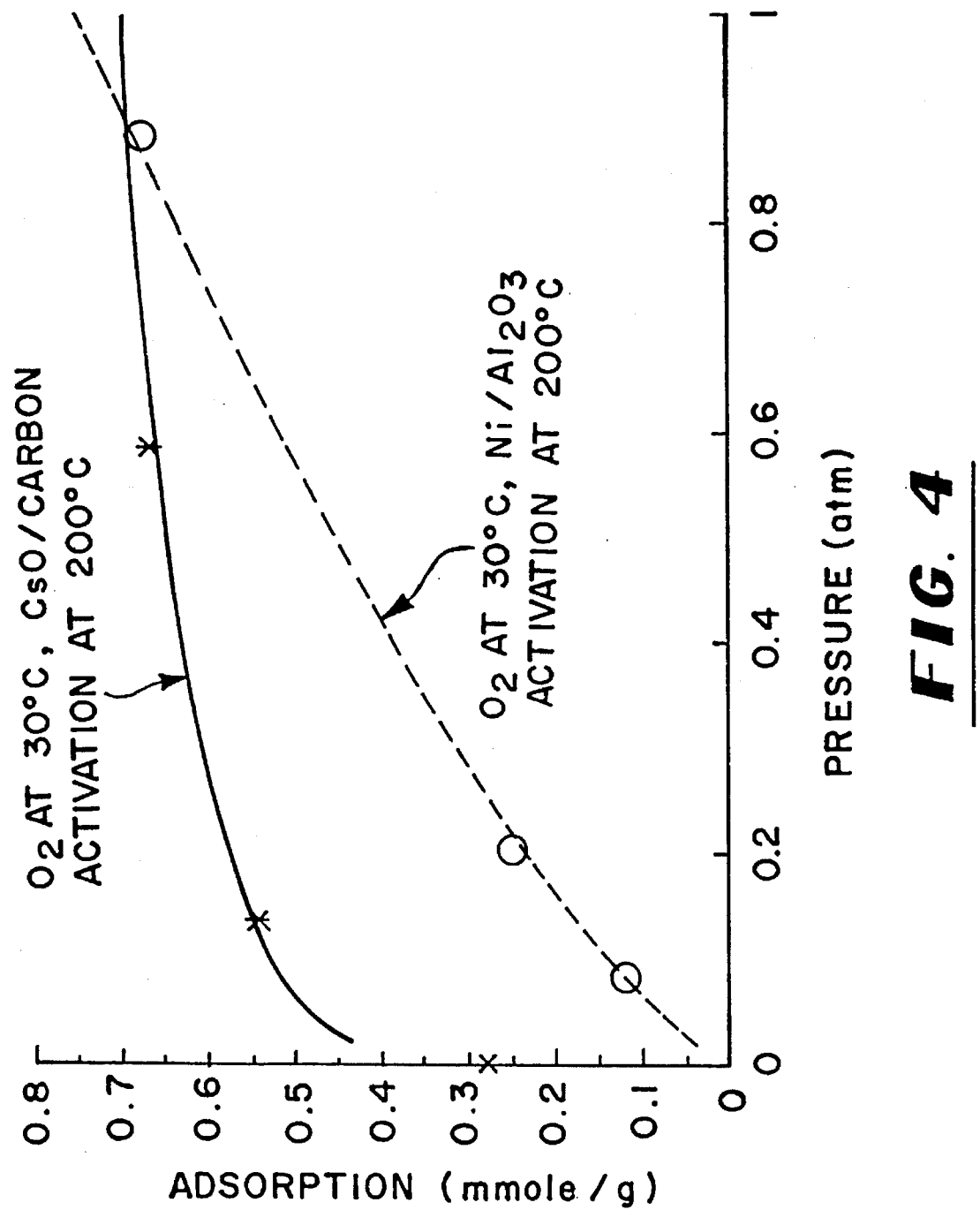
FIG. 4 shows adsorption isotherms for oxygen on cesium acetate loaded carbon and nickel/alumina material.

FIG. 4 shows adsorption isotherms for a cesium oxide on active carbon adsorbent and a commercial nickel on alumina adsorbent (Harshaw Nickel 0104T). The cesium oxide on carbon adsorbent was prepared, as described in Example 1, from activated carbon impregnated with cesium formate. The oxygen capacity of the cesium oxide on carbon adsorbent at 30° C. is much higher than the commercial nickel on alumina material. Prior to oxygen adsorption, the nickel on alumina adsorbent was activated at 200° C. in 1% hydrogen in nitrogen for 16 hours.

THERMOGRAVIMETRIC ANALYSIS

Figure 5:
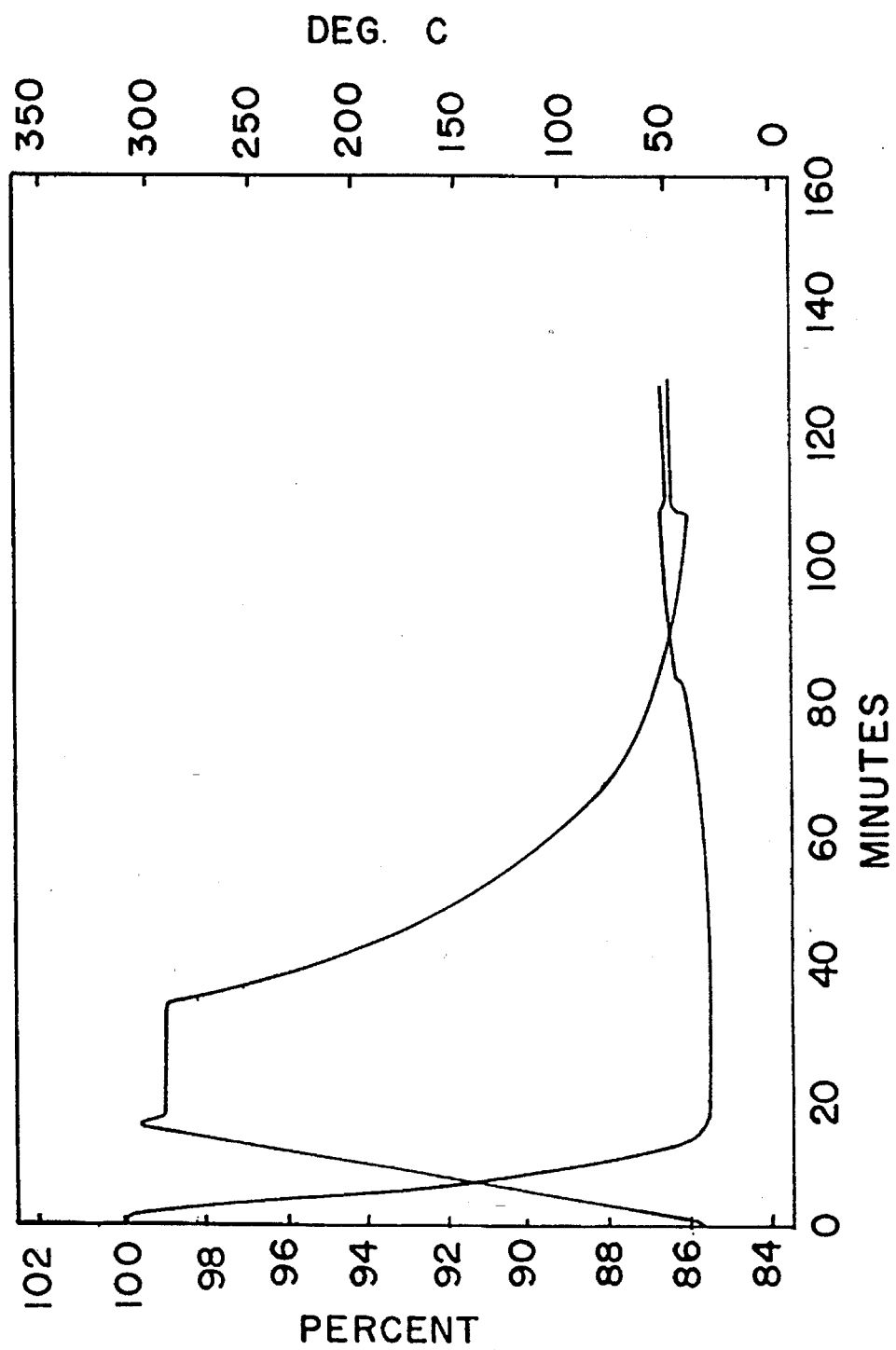

To investigate the oxygen adsorbing capability of the adsorbents described in this invention, thermogravimetric analysis (TGA) was done on a binary mixture of oxygen and nitrogen. The TGA experiment was run as follows: 35 mg of cesium formate impregnated carbon, produced as in Example 1, was placed in the TGA equipment. The sample was heated in nitrogen to 300° C. and held at that temperature for 20 minutes. It was then cooled in nitrogen for approximately one hour, exposed to air at approximately 50° C., and the oxygen uptake measured. FIG. 5 shows that heat treatment to 300° C. produced a weight loss of 14% which is probably due to both water loss and decomposition of the formate anion to the oxide anion. Cooling the sample in nitrogen shows a slight weight gain due to nitrogen adsorption. Introduction of air (at 80 minutes) produced a weight increase of the sample of about 0.6 wt % as shown in more detail in FIG. 6. The weight increase is due to selective adsorption of oxygen over nitrogen and corresponds to an oxygen capacity of approximately 0.2 mmoles/g at an oxygen partial pressure of 0.2 atm. This value is lower than that shown in FIG. 1 because the TGA experiment was carried out at a higher temperature and, when a binary mixture is used, nitrogen depresses the oxygen capacity.

SAMPLE CALCULATION FOR COMMERCIAL APPLICATION

To estimate the effectiveness of the adsorbent produced in Example 1 in a commercial operation, the bed size of an adsorber to remove trace oxygen was calculated. The following inlet conditions were assumed:

T=ambient (30° C.)

P=7.8 atm (100 psig)

Gas flow rate=300,000 scfh

Inlet oxygen impurity=5 ppm

Estimated oxygen capacity=0.6 weight %

Using these inlet conditions, approximately 1600 kgs of adsorbent would be required for an adsorption cycle time of one week. This adsorbent inventory is very reasonable for a commercial operation.

STATEMENT OF INDUSTRIAL USE

Adsorbents comprising metal oxide impregnated reducing supports may be used in production of ultra-high purity inert gases which are supplied to the semiconductor and electronics industries.

We claim:

1. In a process for removing oxygen from an inert gas comprising passing an oxygen containing inert gas stream through an adsorbent bed under conditions for removing oxygen, the improvement which comprises removing trace oxygen from the inert gas stream utilizing an adsorbent comprising a porous reducing support impregnated with an alkali metal oxide or an alkaline earth metal oxide of about 10% to about 90% by weight.

2. The process of claim 1 wherein said porous reducing support is a carbon containing material.

3. The process of claim 1 wherein said porous reducing support is selected from group consisting of activated carbon, carbon black, coal, petroleum coke, and titania.

4. The process of claim 3 wherein said alkali or alkaline earth metal salt is selected from the group consisting of a nitrate, an acetate, a formate, an oxalate, a benzoate, a tartrate, a lactate, and a succinate.

5. The process of claim 4 wherein said alkali or alkaline earth metal is selected from the group consisting of cesium, sodium, potassium, and barium.

6. The process of claim 5 wherein a weight loading of said alkali metal oxide or alkaline earth metal oxide is about 10% to about 30% by weight.

7. An adsorbent for removing trace oxygen from an inert gas comprising a porous reducing support impregnated with an alkali metal oxide or an alkaline earth metal oxide wherein said adsorbent has a weight loading of said alkali metal oxide or alkaline earth metal oxide of about 10% to about 90% by weight.

8. The adsorbent of claim 7 wherein a weight loading of said alkali metal oxide or alkaline earth metal oxide is about 10% to 30% by weight.

* * * * *

UNITED STATES PATENT AND TRADEMARK OFFICE
CERTIFICATE OF CORRECTION

PATENT NO : 5,536,302

DATED : July 16, 1996

INVENTOR(S) : Timothy C. Golden and Charles H. Johnson, III

It is certified that error appears in the above-identified patent and that said Letters Patent is hereby corrected as shown below:

Column 6, line 67 to column 7, line 3,
    Cancel Claim 4.

Column 7, line 4,
    Cancel "4" and insert --3-- therefor.

Signed and Sealed this

Sixth Day of May, 1997

*Attest:*

BRUCE LEHMAN

*Attesting Officer*      *Commissioner of Patents and Trademarks*